United States Patent
Brown et al.

(10) Patent No.: US 7,571,044 B2
(45) Date of Patent: Aug. 4, 2009

(54) VEHICLE AND SUSPENSION SYSTEM FOR NEGOTIATING LOW TRACTION SITUATIONS

(75) Inventors: Todd Brown, Dearborn, MI (US); Jahan Asgari, Dearborn, MI (US); Eric Tseng, Canton, MI (US); Davor Hrovat, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 517 days.

(21) Appl. No.: 11/380,632

(22) Filed: Apr. 27, 2006

(65) Prior Publication Data

US 2007/0255465 A1 Nov. 1, 2007

(51) Int. Cl.
*B60B 39/00* (2006.01)
*B60G 17/00* (2006.01)

(52) U.S. Cl. ............................. 701/91; 701/48; 701/37; 280/5.504

(58) Field of Classification Search ........................ None
See application file for complete search history.

(56) References Cited

U.S. PATENT DOCUMENTS 5,033,573 A * 7/1991 Hrovat ....................... 180/197
5,278,761 A 1/1994 Ander et al.
5,517,414 A * 5/1996 Hrovat ........................ 701/91
5,563,792 A 10/1996 Ander et al.
6,622,074 B1 * 9/2003 Coelingh et al. .............. 701/48
2005/0235765 A1 * 10/2005 Herbster et al. ........... 74/336 R

FOREIGN PATENT DOCUMENTS

| DE | 3610519 | * 10/1987 |
|---|---|---|
| EP | 0284053 | 9/1988 |
| EP | 0300496 | 1/1989 |
| EP | 0672549 | 9/1995 |
| GB | 2251412 | 7/1992 |
| GB | 2313347 | 11/1997 |
| JP | 7223420 | 8/1995 |
| WO | 00/35688 | 6/2000 |
| WO | 2004028846 | 4/2004 |

* cited by examiner

*Primary Examiner*—Michael J. Zanelli
(74) *Attorney, Agent, or Firm*—Allan J. Lippa; Alleman Hall McCoy Russell & Tuttle LLP

(57) ABSTRACT

A method for controlling a vehicle having a suspension is provided. The method comprises, during longitudinal oscillations of the vehicle, adjusting a suspension member to vary a normal force between the vehicle and the surface, where the suspension adjustment is based on the longitudinal oscillations.

22 Claims, 9 Drawing Sheets

VEHICLE AND SUSPENSION SYSTEM FOR NEGOTIATING LOW TRACTION SITUATIONS

BACKGROUND AND SUMMARY

Vehicle traction control system may be used to control or limit wheel drive torque and thereby reduce wheel slip in order to provide improve vehicle handling. However, one challenging tasks for current traction control systems occurs in a situation where a vehicle may be stuck in deep snow, mud, or sand. Under such conditions, even with reduced and controlled wheel torque, the particular vehicle position and road conditions create a situation where there is simply insufficient friction to generate sufficient vehicle motion to enable the vehicle to negotiate out of the stuck condition.

As such, under such conditions, a driver may manually disable the traction control system and proceeds to rock the vehicle longitudinally by manually changing the transmission sequentially between forward and reverse. For example, in an automatic transmission having gears such as Park, Reverse, Neutral, Driver, and Low (PRNDL), the driver manually oscillates between D and R. Many times, despite the driver's best intention and effort, it is still not possible to dig the vehicle out of the ditch or other stuck condition.

One approach to increase a tractive effort of the vehicle is described in WO 0035688. In this example, the vehicle is oscillated vertically via a hydraulic suspension-like actuator to get out of sand.

However, the inventors herein have recognized a disadvantage with such an approach. Specifically, there is no coordination between the vertical force and motion of the vehicle, such as the longitudinal action of the vehicle. As such, if the vehicle operator is unable to synchronize the vehicle motion with the vertical/suspension force, the vehicle may actually become further entrenched in the sand.

To assist the vehicle operator in negotiating stuck vehicle and other situations, the inventors herein have recognized that coordination between forces generated by a suspension system and forward-backward vehicle motion may be used to increase vehicle tractive effort.

For example, active suspension intervention may be coordinated with sequential or oscillatory vehicle forward-reverse rocking action to increase vehicle traction. In one embodiment, the suspension actuation may be used to increase an active force of the suspension at appropriate instances or durations so that the amplitude of the resulting vehicle oscillation increases. This increase may then eventually help the vehicle to come out of it stuck condition, or hole.

Thus, the inventors herein have recognized that action similar to what a child does on a swing, where the child modulates the lower part of his legs to increase the swing motion, may be applied to the stuck vehicle condition via an active suspension, for example.

DETAILED DESCRIPTION

Figure 1:
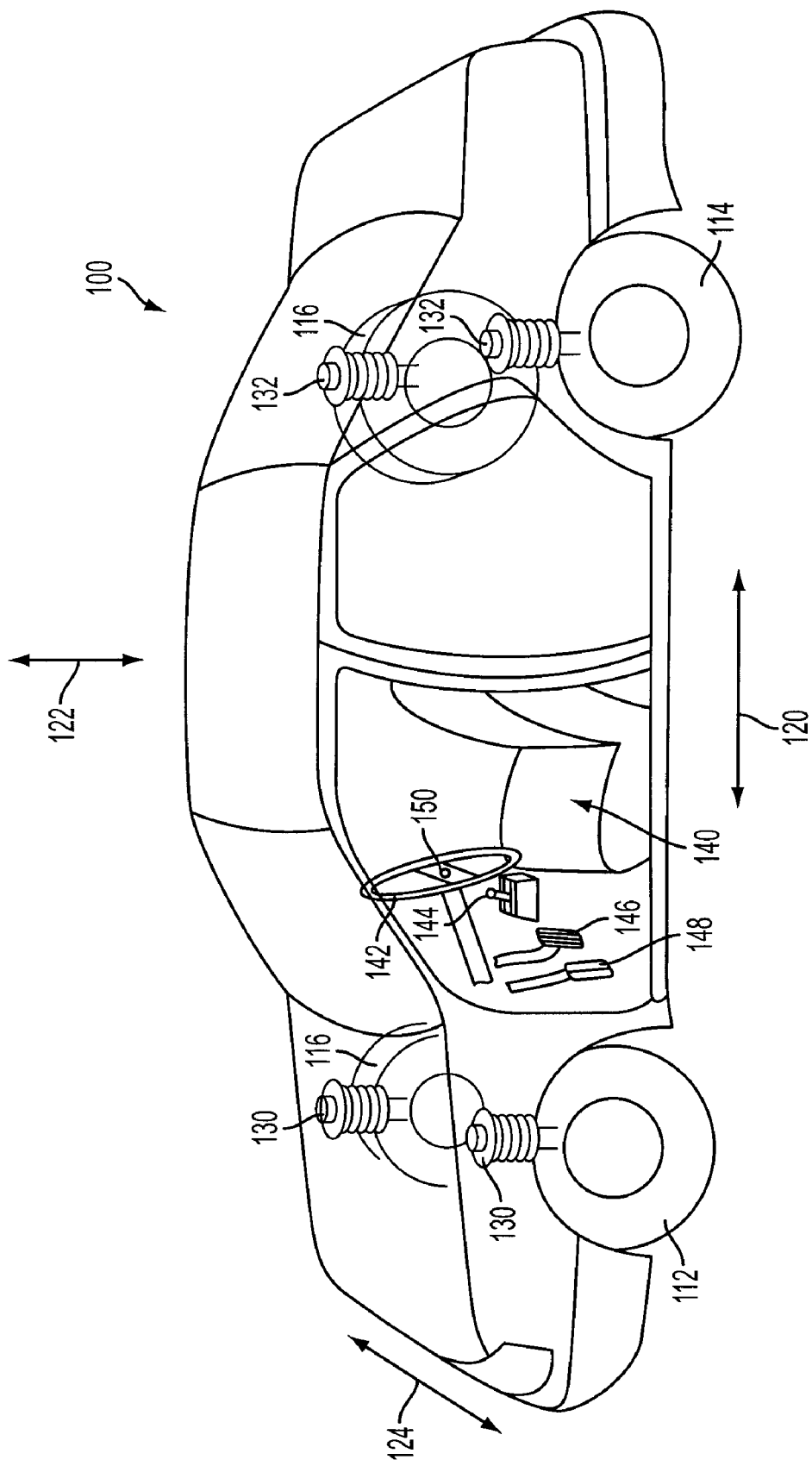
FIG. 1 shows an example vehicle system.

FIG. 1 shows an example vehicle 100 having four wheels 112, 114, 116, and 118. Further, arrow 120 defines the longitudinal direction (or forward-backward direction) of the vehicle, arrow 122 defines the vertical direction (or up-down direction, or bounce) of the vehicle, and arrow 124 defines the transverse direction (or left-right direction, into/out of the page of FIG. 1).

Continuing with FIG. 1, a front suspension system 130 is shown coupled to front wheels 112 and 116 and a rear suspension system 132 is shown coupled to rear wheels 114 and 118. In another example, each wheel may have an independent suspension system. The suspension system(s) may include various components, including springs, shock absorbers and linkages that connect the vehicle to its wheels.

Various types of suspension systems may be used, and the front and rear suspensions may be different for example. For example, any the suspension systems may be either dependent or independent, referring to the ability of opposite wheels to move independently of each other. In the example of a dependent suspension, a live axle may be used that holds wheels parallel to each other and perpendicular to the axle. When the camber of one wheel changes, the camber of the opposite wheel changes in the same way. In the example of an independent suspension, wheels can rise and fall on their own without affecting the opposite wheel. Suspensions with other devices, such as anti-roll bars that link the wheels in some way, may still be classed as independent.

Yet another type of suspension that may be used is a semi-dependent suspension. In this case, jointed axles are used, on drive wheels, but the wheels are connected with a solid member.

The suspension systems of each wheel may be an active or semi-active suspension, in which a force may be applied to the suspension system, and/or where properties of the suspension system may be varied with operating conditions. For example, the springs in the suspensions may have a variable spring rate, such as depending on the amount of deflection. Further, in the example, where the suspension of one or more wheels is an active suspension, the spring rate may further depend on additional parameters. As another example, the damping in the system may vary with operating conditions, such as in a semi-active suspension where the damping may be electronically adjusted based on operating conditions such as vehicle speed, deflection of the wheel, and other parameters.

In another example of a semi-active suspension, the system may include devices such as air springs and switchable shock absorbers, various self-leveling solutions, as well as other hydraulic and/or pneumatic systems. Also, the shock absorbers may be filled with a magneto-rheological fluid, whose viscosity can be changed electromagnetically, thereby giving variable control without switching valves.

In the example of an active suspension, it may use a fully active suspension having electronic monitoring of vehicle conditions, coupled with adjustment of vehicle suspension and behavior in real time to directly control the motion of the vehicle. For example, the system may include actuators to apply positive and/or negative forces within the suspension system. The system may use linear motors, hydraulic actuators, pneumatic actuators, or combinations thereof.

Continuing with FIG. 1, it also shows a driver seat 140 having a steering wheel 142, transmission shift operator 144, accelerator pedal 146, and brake pedal 148. Further, a driver actuated switch, dial, button, or the like is illustrated at 150, being incorporated into steering wheel 142 in this example. However, switch 150 may be located in various positions, such as on a dashboard of the vehicle, on a turn signal lever, or various other locations. As will be described below, switch 150 may be a "vehicle stuck" switch in which can be activated by the driver to provide specific vehicle and powertrain operation in conditions where the vehicle cannot gain traction. For example, even vehicles having highly advanced traction control systems may still be unable to obtain motion under some circumstances, such as when the friction between the wheels and the road is so low that it is not possible to obtain movement via torque reduction and/or braking alone. In such conditions, additional vehicle suspension adjustments can be made in coordination with torque control to provide improved ability to obtain motion of the vehicle, as is described in more detail below herein.

Additional driver actuated inputs may also be provided, such as a traction control switch (not shown) for enabling/disabling a traction control system of the vehicle. Further, in one example, switch 150 may be a multi-purpose switch for both traction control and "stuck" vehicle conditions.

Figure 2:
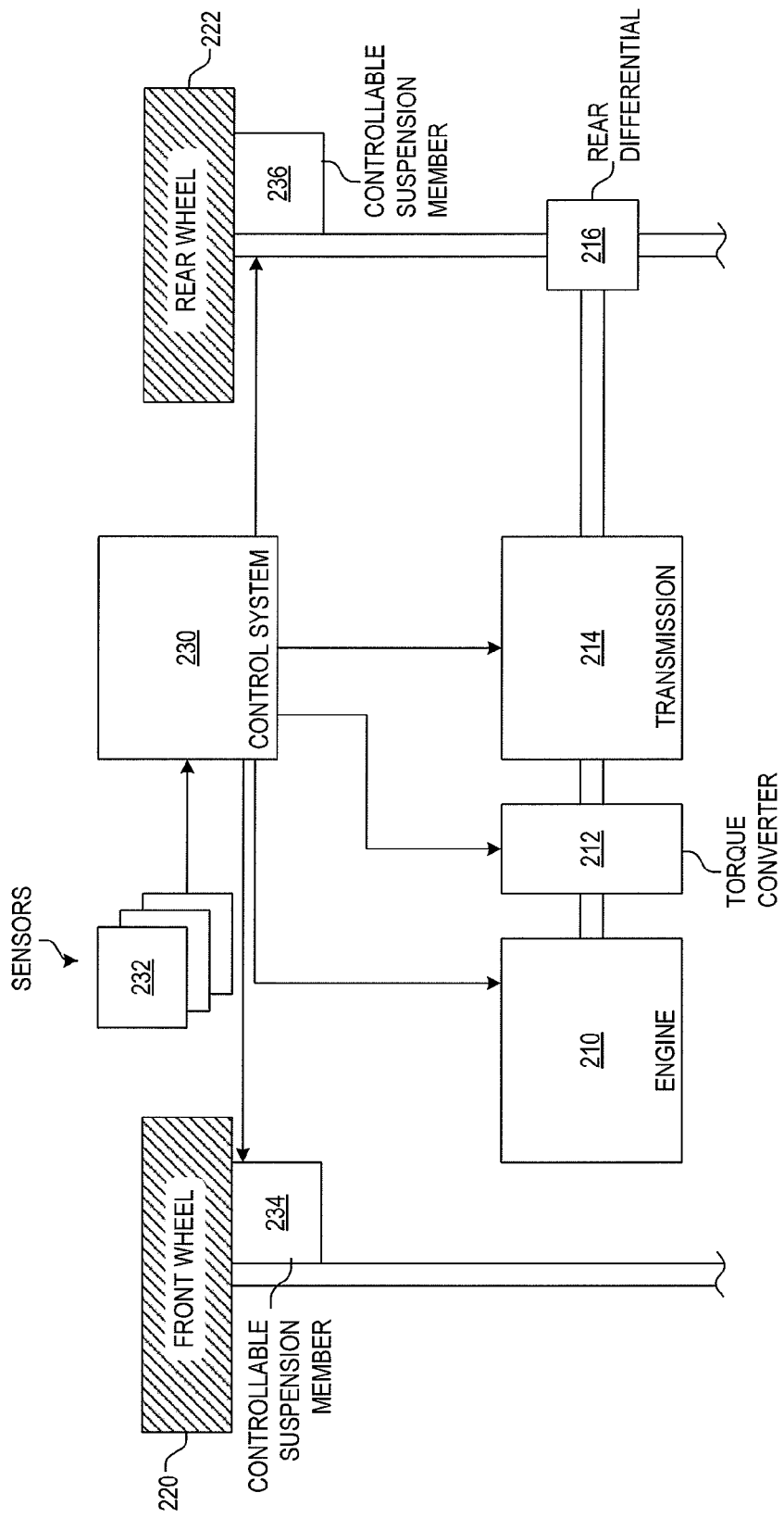
FIG. 2 shows a schematic illustration of a vehicle powertrain and suspension system.

Referring now to FIG. 2, it shows a schematic diagram of an example system configuration. This example illustrates a rear-wheel drive system, however, in an alternative embodiment, a front wheel drive or all wheel drive system may be used. Specifically, engine 210 is should coupled through a torque converter 212 to transmission 214. Transmission 214 may be an automatic transmission, manual transmission, or combinations thereof such as an auto-shift manual transmission. The output of the transmission is transferred to the rear differential 216, or final drive unit, to the rear wheels, one of which is shown at 222. The rear wheel is further shown having a controllable suspension member 236. Likewise, front wheel 220 is also shown having a controllable suspension member 234.

A control system 230, which may comprise one or more controllers, is shown receiving inputs from various sensors 232. The sensor may include various parameters, such as engine sensors, transmission sensors, braking sensors, wheel sensors, suspension sensors, driver inputs, and/or others. For example, the sensor information may include front/rear wheel speed, wheel slip, vertical wheel displacement, brake status, driver gear selection, transmission state, engine speed, engine load, torque converter clutch state, and others.

As will be described in further details herein, control system 230 may control suspension operation to increase a tractive force in dependence on longitudinal motion/oscillation of the vehicle.

Figure 3:
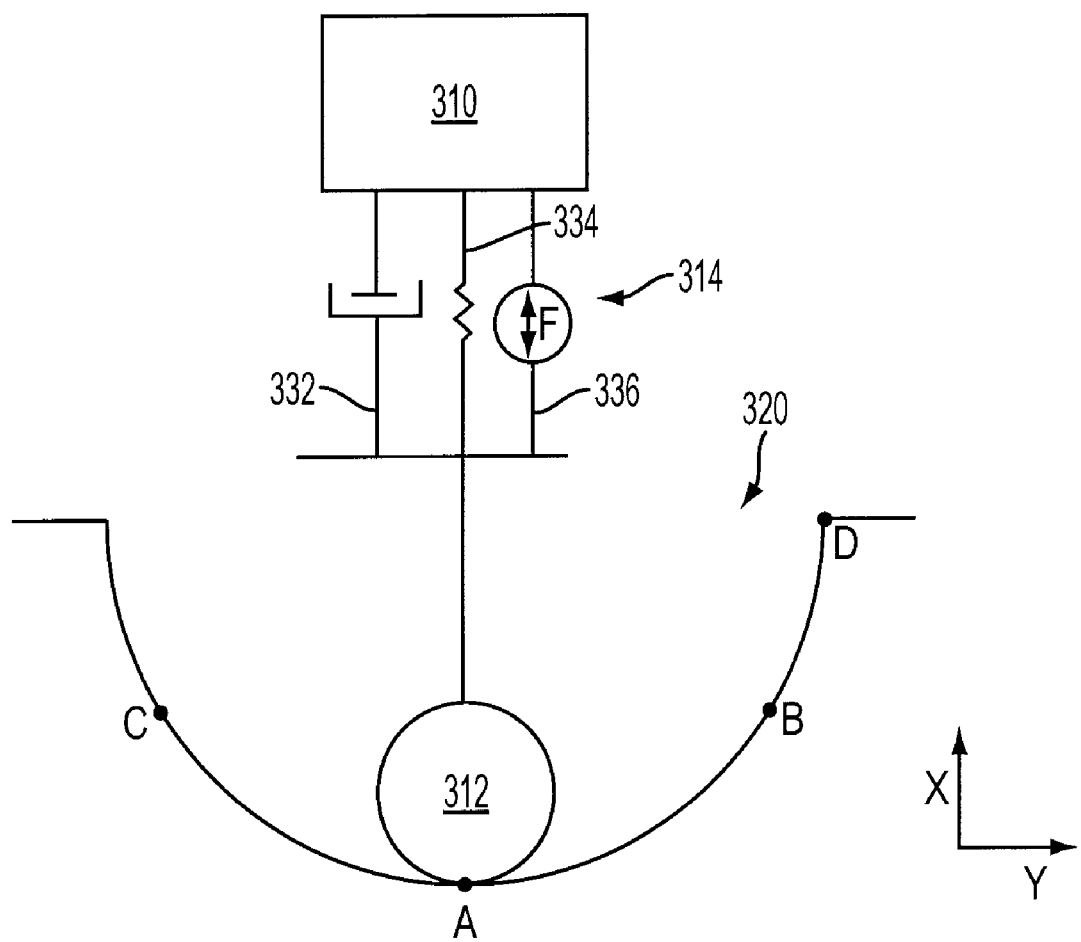
FIG. 3 shows a schematic model of a vehicle and suspension.

Referring now to FIG. 3, a simplified schematic diagram of the vehicle system being stuck in a hole, such as due to sand, is illustrated. Specifically, FIG. 3 shows a vehicle 310 with suspension 314 having a wheel 312 stuck in a ditch 320, where the ditch has points A, B, C, and D as labeled. The suspension 314 is schematically illustrated via a damper 332, spring 334, and active element 336, where the active element is capable of generating positive or negative forces between wheel 312 and body 310. As noted herein, this is just an example schematic diagram to illustrate example operation, and not meant to be a complete description of the active or semi-active suspension.

In this example, it is assumed that the goal is to enable the vehicle 310 to traverse out of the ditch 320, and more specifically, from Point A to Point D.

Figure 4:
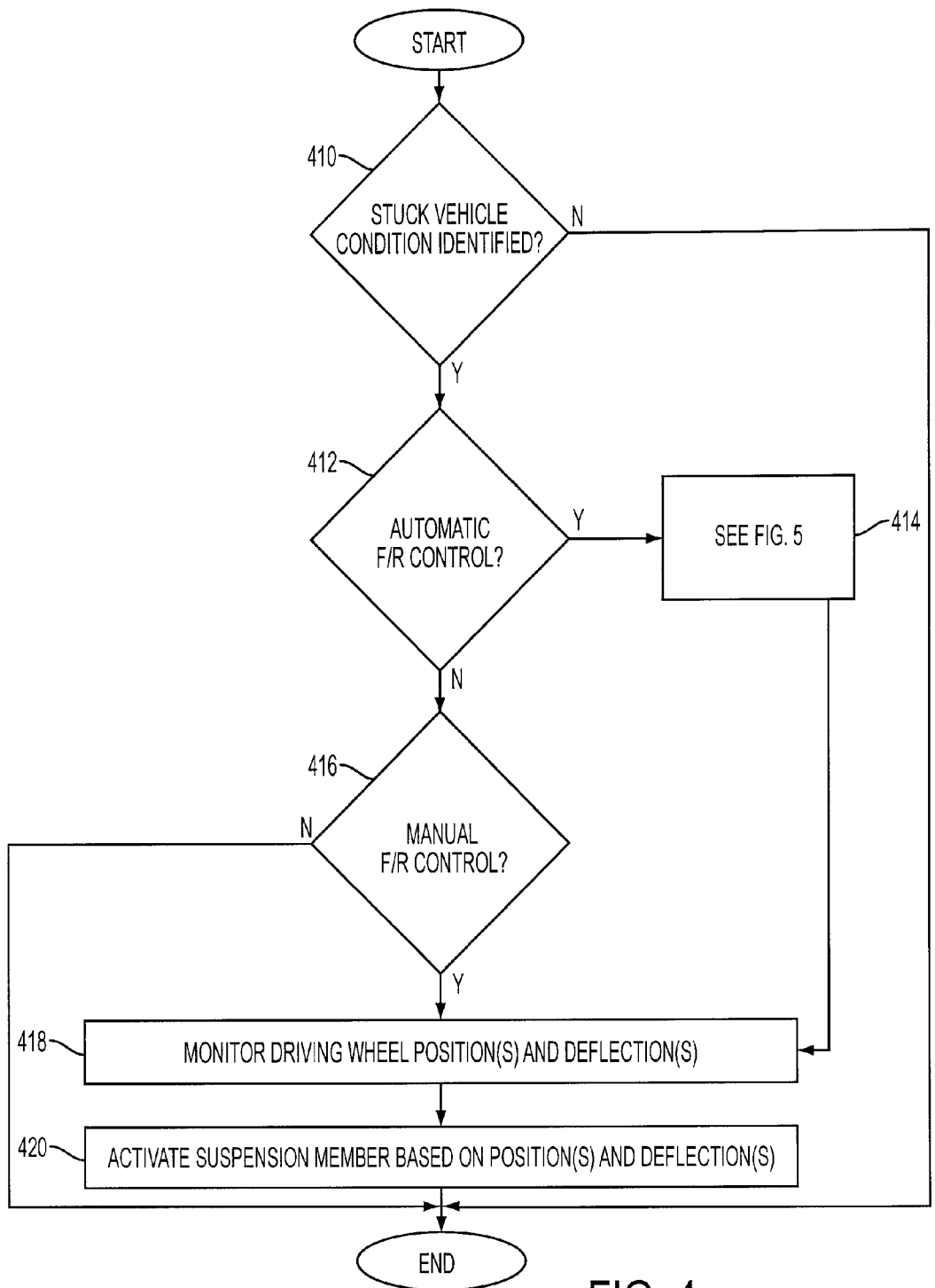
FIGS. 4-6 show high level flowcharts of example operation.

Referring now to FIG. 4, a routine is described for controlling powertrain, suspension, and/or braking operation of the vehicle to improve operation in stuck vehicle conditions, such as when the vehicle is stuck in sand.

Figure 5:
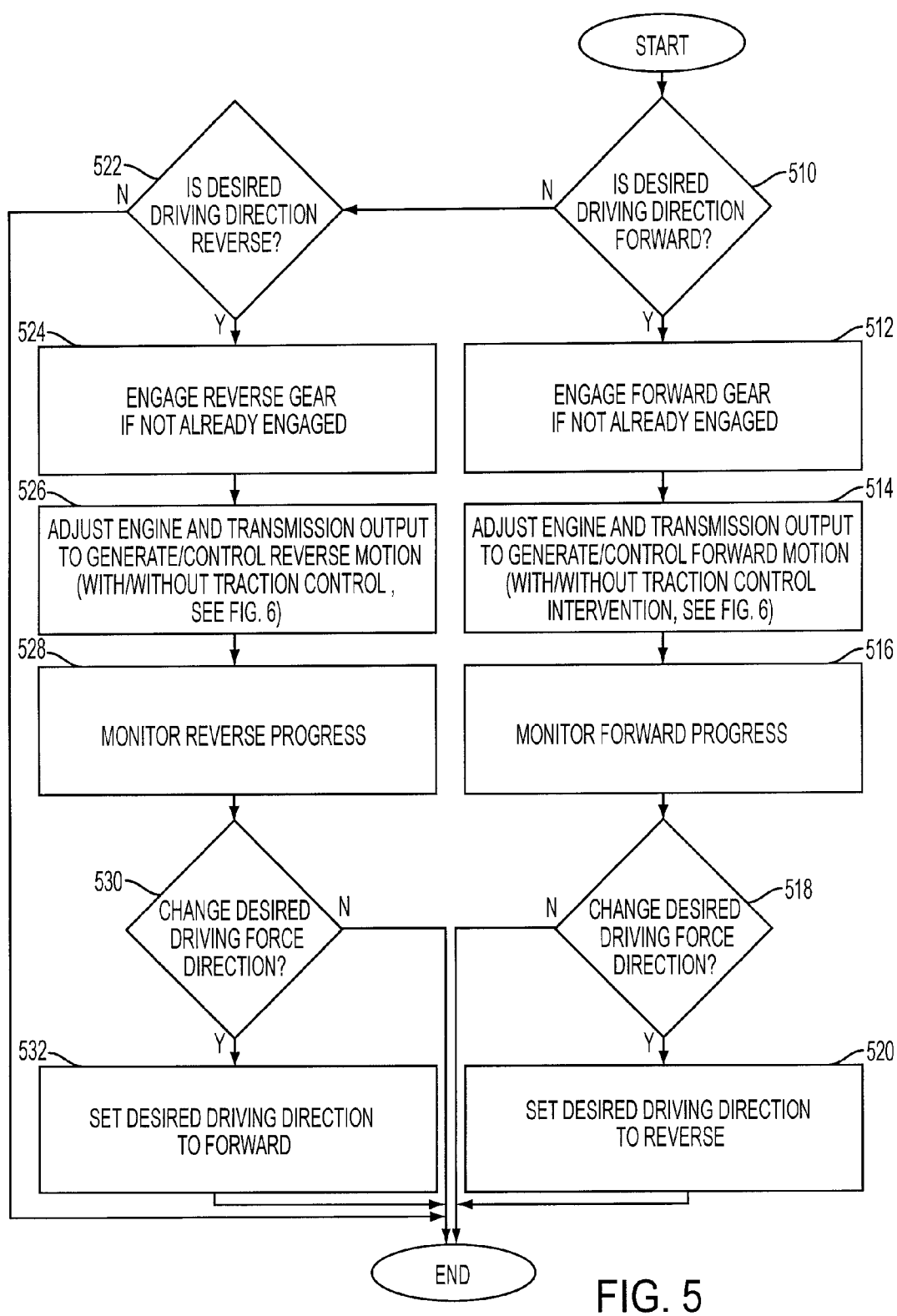

First, in 410, the routine determines whether a stuck vehicle condition has been identified. For example, the routine identifies whether a driver actuated switch (e.g., 150) has been actuated. Alternatively, the routine may automatically identify such a situation based on traction control information, such as vehicle wheel speeds, gear position, etc. If no, the routine ends. Otherwise, the answer to 410 is yes, the routine continues to 412 to determine whether automatic forward/reverse control is enabled or to be performed. This determination and the enablement of such control can again be based on a driver selectable switch, or other inputs and operating parameters. If the answer is yes, the routine continues to 414 where the routine of FIG. 5 is carried out, after which the routine continues to 418. Alternatively, the routine continues to 416. The automatic forward/reverse control may include automatic gear shifting of the transmission via the control routines to further coordinate forward/reverse vehicle rocking with adjustment of suspension members to increase a normal force between the vehicle tires and the road surface (e.g., sand).

In 416, the routine determines manual forward/reverse control is enabled or to be performed. This determination and the enablement of such control can again be based on a driver selectable switch, or other inputs and operating parameters. For example, the driver may select between manual and automatic forward/reverse control. If the answer is no, the routine continues to 414 where the routine ends and no additional adjustment of operating parameters is carried out. Rather, the driver retains control of the powertrain, brakes, etc., and the suspension continues to operate assuming normal driving conditions.

Alternatively, when the answer to 416 is yes, the routine continues to carry out example coordination between forward/backward vehicle rocking or motion and an at least partially active suspension member to increase a normal force between the vehicle tires and the road surface (e.g., sand). Specifically, in 418, the routine monitors driving wheel position(s) and deflection(s), along with other operating parameters. For example, the routine may further monitor non-driven wheel position and deflection, vehicle positioning/movement, and various other parameters. Based on the information from 418, in 420, the routine actuates one or more suspension members based on the position(s) and deflection(s) to increase a normal force between the tire and road surface. As one example, the routine adjusts an active or semi-active suspension member in synchronism with and based on forward/backward rocking motion of the vehicle to enable an increased normal force between the tire and the road. Further, the suspension member may be controlled so that the increased normal force occurs at or near end points of the forward/backward motion to enable vehicle motion from an otherwise stuck condition.

For example, the routine may adjust one or more active suspension members to increase a force or stiffness between the wheel and the vehicle body in coordination with sequential vehicle back and forth rocking action. In other words, the suspension actuation is used to increase the active force at appropriate times so that the amplitude of the resulting oscillation is increased, which should eventually help the vehicle to come out of its stuck state.

There are various approaches of coordination between the vehicle motion and the suspension actuation that may be used, such as the following different possible approaches, or combinations thereof. In each example, although not required, the driver manually controls the transmission (using the gear selector) and engine (using the acceleration pedal) to generate forward-backward motion of the vehicle. Alternatively, such motion may be automatically generated, as noted herein.

Assuming through the forward-backward action the vehicle was only capable of moving between the points C and B of FIG. 3, the proposed active suspension actuations may further assist the vehicle to Point D and beyond, i.e. in getting out of the ditch.

Figure 7:
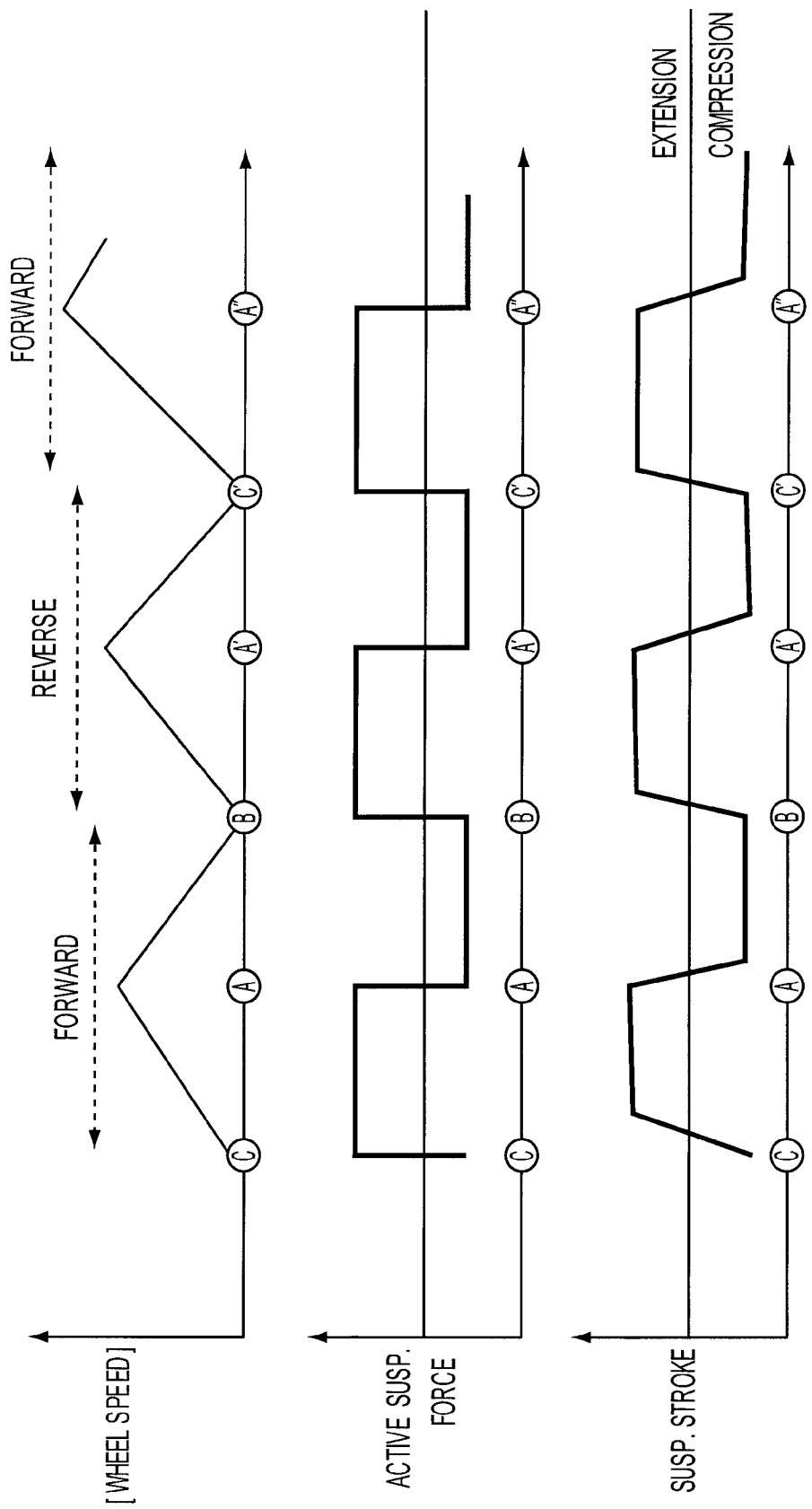
FIGS. 7-9 show graphs of example operation.

In the first example approach where the forward-backward motion generated by the engine and transmission enables the vehicle to oscillate between B and C of FIG. 3, the routine applies an active force at points B and C, such as via element 336. At these points, the vehicle velocity and wheel rotational speed is zero which facilitates producing the largest possible peak torque, based on observed tire characteristics. The active force can then be released (or reduced), at point A. Note that after a few vehicle forward/backward oscillations (during which the "stuck" condition was detected), the wheel speed velocity profile, from non-driven wheels or driven wheels (with no wheel-spin), would correspond to the vehicle oscillation profile of the top graph of FIG. 7. With the learned profile, the active suspension force can be triggered based on wheel speeds. For example, a maximum active suspension force is triggered at/around wheel speed of zero and a minimum active suspension force is triggered at decreasing wheel speed at point A as shown in FIG. 7. FIG. 7 also shows the corresponding suspension stroke. This approach may be particularly useful for the surfaces on which tire force potential at/around zero speed is much higher than at other speeds. One example is the ice surface, where the traction potential can be up to three times larger.

Further, the size and direction of the active force can be varied based on a position of the vehicle, such as its relative position to any one or more of points A-D.

Different methods may be used based on the learned road surface information. For example, a traction control system can probe the surface characteristics through the wheel dynamics during the first wheel spin. The active suspension coordinating strategy can then act accordingly. In one example, the timing, duration, and/or level of actuation of a suspension member can be adjusted in response to a learned road condition, where the learned condition is based on a measured response during a previous wheel slip condition.

Figure 8:
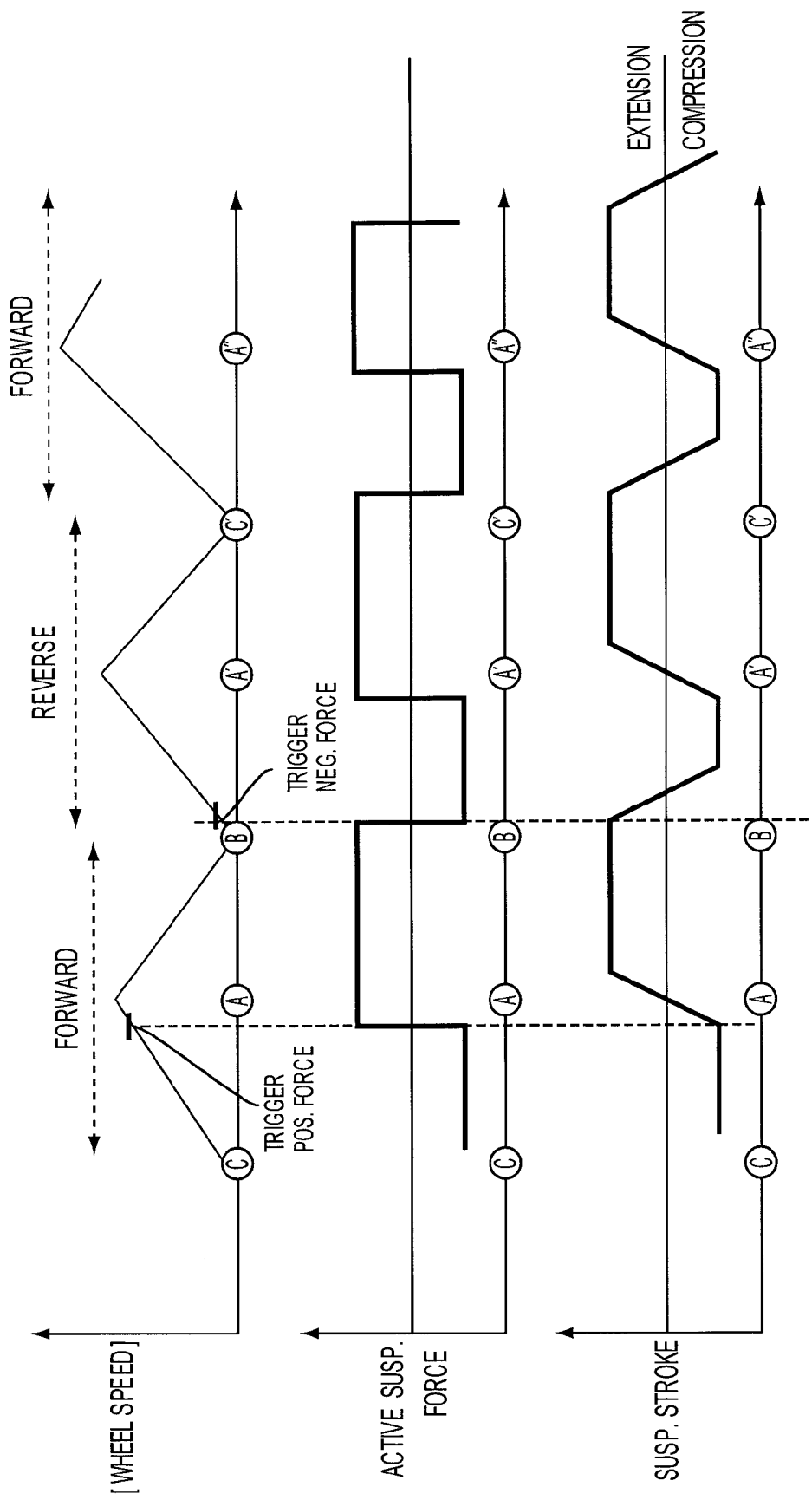

In a second example approach, the routine applies a rapidly increasing active suspension force at point A (which has the minimum slope, resulting in the transfer of all of the tractive force in the x-direction) and holds the suspension force (or at least does not decrease it) while going away from point A. Then, the routine release or decreases the applied force when going toward point A. Note that after a few vehicle forward/backward oscillations (during which the "stuck" condition was detected), the wheel speed velocity profile would correspond to the vehicle oscillation profile of FIG. 7. With the learned profile, the active suspension force can be triggered based on wheel speeds. For example, a maximum active suspension force is triggered at a threshold upon increasing wheel speed and a minimum active suspension force is triggered at another threshold if the wheel speed decreased to zero and increases again, as shown in FIG. 8. FIG. 8 also shows the corresponding suspension stroke. FIG. 8 also shows that more energy can be put into the vehicle system (within one suspension stroke) if the extension stroke is applied when passing through point A. This is because the active suspension force needs to defy both the gravity as well as the centrifugal force as it raises the suspension. Around point A, the centrifugal force reaches its maximum. This approach of increasing the rocking excitation is particularly useful when no traction force is or can be provided. One example where no traction force is provided occurs when the vehicle is in neutral and is rocked/pushed by people standing outside of the vehicle.

Figure 9:
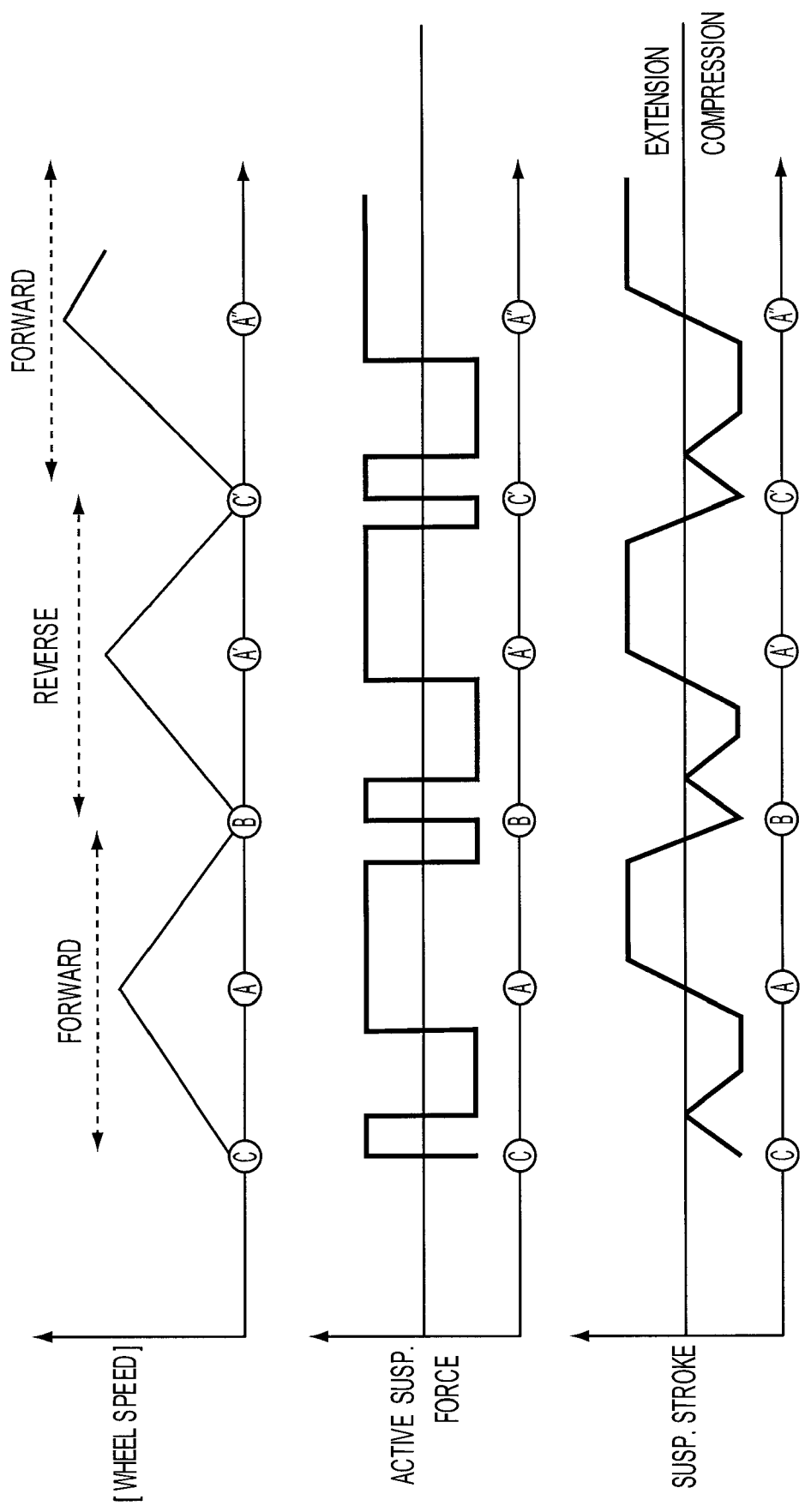

In a third example approach, the above two features may be combined to obtain the benefits of both methods above and the active suspension force application are more frequent as a result, as shown in FIG. 9.

In a fourth example approach, the active suspension is adjusted to mimic the behavior of a negative shock absorber after a "stuck" situation is identified or upon specific driver's manual input/request. A negative shock absorber behavior can be mimicked by an active suspension if the active suspension force is applied in the same direction of suspension velocity. That is, the active suspension keeps putting energy into the vehicle system. Therefore, a hopping vehicle/suspension can occur with some initial excitations (which are usually un-desirable) and create the rocking motion to enable the vehicle to traverse the stuck situation.

In a fifth example approach, the active suspension utilizes on-line learning and model predictive control to determine the optimal suspension force application, based on observed wheel dynamics.

As noted herein, the vehicle forward/reverse motion can also be automated with an electronic "PRNDL" feature (or drive by wire feature) upon the detection of "stuck" situation and synchronized with the desirable suspension motions. An example of such operation is described with regard to FIG. 5. Specifically, in 510, the routine determines whether the desired driving direction is forward. If so, the routine continues to 512 to adjust transmission 214 to engage a forward gear, such as "Drive" if it is not already engaged. Then, in 514 the routine adjusts the engine and transmission output to generate/control forward motion, such as by adjusting a throttle plate of the engine, torque converter slip, suspension actuation, or various other parameters to adjust powertrain output. Further, the routine may further adjust wheel torque, such as via a traction control system intervention, which may further include actuating one or more wheel brake systems. Additional interaction with a traction control system is described herein with regard to FIG. 6.

Continuing with FIG. 5, in 516 the routine monitors forward progress, such as the amount of forward motion generated relative to the ground. Next, in 518, the routine determines whether to change the desired driving force direction, which may be based on various parameters, such as past motion history, current position and velocity, or others. If so, the routine continues to 520 to set the desired driving direction to reverse. Otherwise, the routine returns.

If the answer to 510 is no, the routine continues to 522 to determine whether the driving direction is reverse. If not, the routine returns. Otherwise, the routine continues to 524 to adjust transmission 214 to engage a reverse gear, such as "Reverse" if it is not already engaged. Then, in 526 the routine adjusts the engine and transmission output to generate/control reverse motion, such as by adjusting a throttle plate of the engine, torque converter slip, suspension actuation, or various other parameters to adjust powertrain output. Further, the routine may further adjust wheel torque, such as via a traction control system intervention, which may further include actuating one or more wheel brake systems. Additional interaction with a traction control system is described herein with regard to FIG. 6.

Continuing with FIG. 5, in 528 the routine monitors reverse progress, such as the amount of forward motion generated relative to the ground. Next, in 530, the routine determines whether to change the desired driving force direction, which may be based on various parameters, such as past motion history, current position and velocity, or others. If so, the routine continues to 532 to set the desired driving direction to forward. Otherwise, the routine returns.

In this way, it is possible to coordinate automatic forward-backward motion of the vehicle with suspension actuation to improve vehicle traction in various conditions, such as a stuck vehicle condition.

Figure 6:
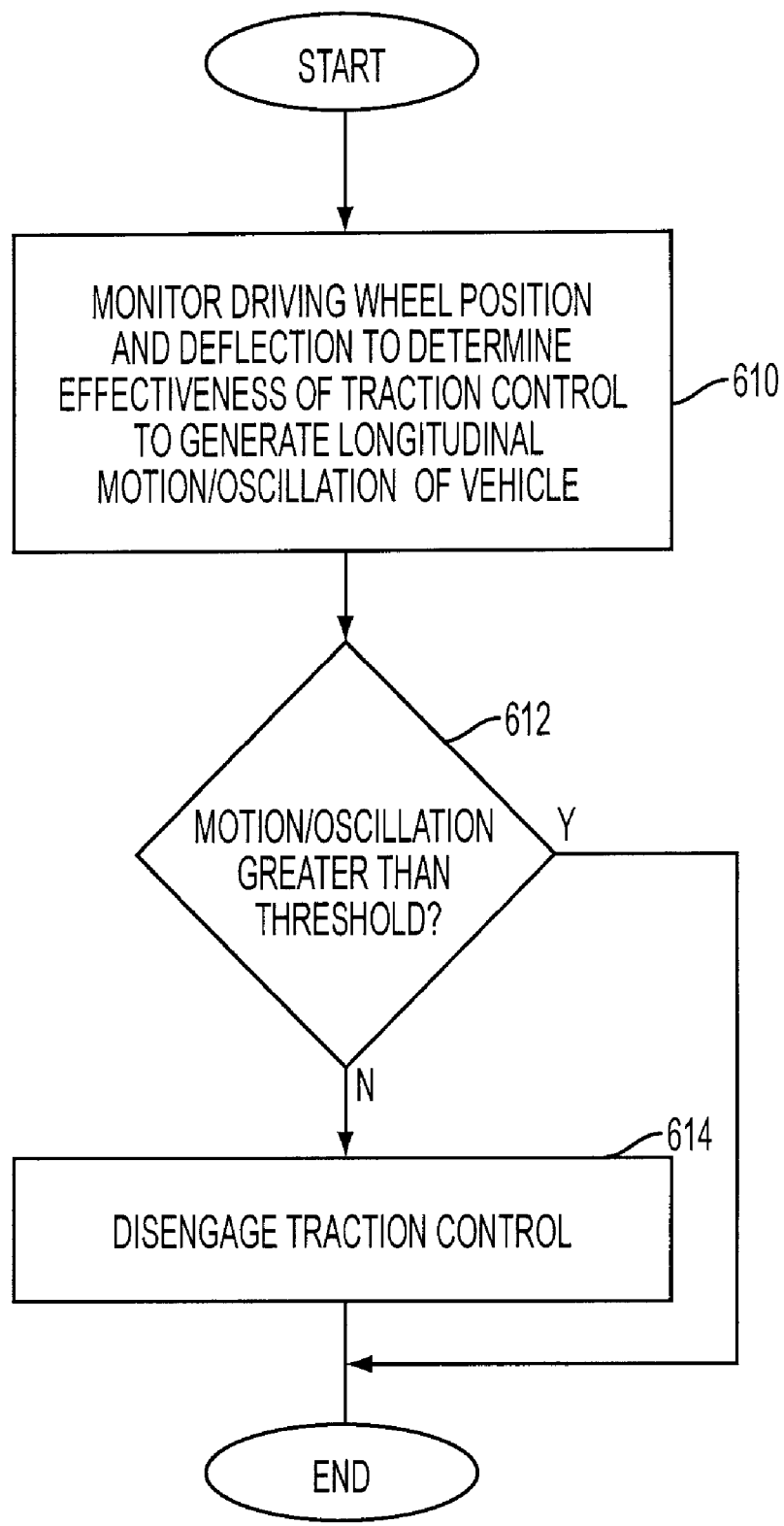

Referring now to FIG. 6, a routine is described for coordinating traction control operation with suspension actuation. Specifically, in 610, the routine monitors driving wheel position and deflection to determine an effectiveness of traction control to generate longitudinal motion/oscillation of the vehicle. Then, in 612, the routine determines whether the motion/oscillation is greater than a threshold value. If so, the routine ends. If not, the routine disengages the traction control so that the vehicle operator can generate sufficient forward/backward motion without traction control intervention. In this way, advantageous coordination with traction control may be achieved.

Note that the control routines included herein can be used with various vehicle and suspension configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in a controller.

It will be appreciated that the configurations and routines disclosed herein are exemplary in nature, and that these specific embodiments are not to be considered in a limiting sense, because numerous variations are possible. For example, the above technology can be applied to four-wheel drive trucks and/or utility vehicle, two or three-wheeled vehicles, etc. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for controlling a vehicle having a suspension, the method comprising:
during longitudinal oscillations of the vehicle, adjusting a suspension member to vary a normal force between the vehicle and the surface, where said suspension adjustment is based on said longitudinal oscillations.

2. The method of claim 1 wherein a timing of said adjustment is based on a vehicle position of said longitudinal oscillations.

3. The method of claim 2 wherein said suspension member is adjusted to vary said force based on a vehicle position of said longitudinal oscillations.

4. The method of claim 1 wherein said suspension member is adjusted to vary said force based on a vehicle position of said longitudinal oscillations.

5. The method of claim 1 further comprising adjusting a wheel torque during said longitudinal oscillations of the vehicle.

6. The method of claim 5 wherein said wheel torque is adjusted based on said longitudinal oscillations of the vehicle by adjusting engine output.

7. The method of claim 1 further comprising generating said longitudinal oscillations by adjustment of a transmission of the vehicle.

8. The method of claim 1 further comprising adjusting a vehicle brake during and based on said longitudinal oscillations of the vehicle.

9. The method of claim 1 wherein said normal force is varied to increase said vehicle oscillation.

10. The method of claim 1 wherein a timing of said adjustment is based on a direction of wheel acceleration.

11. The method of claim 1 wherein a timing of said adjustment is based on wheel speed.

12. The method of claim 1 wherein a timing of said adjustment is based on wheel speed and a direction of wheel speed change.

13. The method of claim 1 wherein said suspension member is adjusted to generate said normal force in a common direction as motion of the suspension.

14. The method of claim 1 wherein a timing of said adjustment is based on a period/frequency of said longitudinal oscillations.

15. The method of claim 14 wherein said suspension member is adjusted to vary said force based on a period/frequency of said longitudinal oscillations.

16. The method of claim 1 wherein said suspension member is adjusted to vary said force based on the period/frequency of said longitudinal oscillations.

17. A method for controlling a vehicle having a suspension and disposed on a surface, the method comprising:
varying a normal force between the suspension and the surface in response to a sequential, back-and-forth, longitudinal motion of the vehicle and to a deflection of the suspension system to increase said normal force and thereby increase said longitudinal motion.

18. The method of claim 17 further comprising coordinating said variation of said force with said longitudinal motion and deflection.

19. The method of claim 18 further comprising disabling traction control operation during at least a portion of said variation of said force.

20. The method of claim 17 further comprising varying said force in synchronism with and based on a rocking motion of the vehicle.

21. A system for a vehicle having an adjustable suspension and a driver's seat, the vehicle disposed on a road surface, the system comprising:
a driver actuated input; and
a control system configured to, during a first manual input condition, vary a condition of the adjustable suspension to reduce transmission of vertical forces to the driver's seat of the vehicle caused by irregularities in the road surface; and during a second manual input condition, vary the condition of the adjustable suspension to increase transmission of vertical forces to the driver's seat of the vehicle caused by irregularities in the road surface;
the control system further configured to vary a normal force between the vehicle and the road to increase longitudinal vehicle oscillations during said second manual input condition.

22. The system of claim 21 further comprising a traction control system of the vehicle, said control system configured to enable traction control operation based on said first or second manual input condition.

* * * * *